United States Patent [19]

Chujo et al.

[11] Patent Number: 5,362,571
[45] Date of Patent: Nov. 8, 1994

[54] MAGNETIC TAPE FOR USE IN CASSETTE FOR DIGITAL AUDIO TAPE RECORDER AND BIAXIALLY ORIENTED POLYESTER BASE FILM THEREFOR

[75] Inventors: Takao Chujo; Hisashi Hamano; Masanori Nishiyama; Yasuhiro Saeki; Tatsuya Ogawa, all of Sagamihara; Kouhei Endou, Anpachi, all of Japan

[73] Assignee: Teijin Limited, Osaka, Japan

[21] Appl. No.: 213,638

[22] Filed: Mar. 16, 1994

[51] Int. Cl.⁵ ...................... B32B 23/08; B32B 27/34; C08G 63/02
[52] U.S. Cl. .............................. 428/480; 428/694 ST; 528/298; 528/308
[58] Field of Search ............... 428/480, 694 ST; 528/298, 308

[56] References Cited

U.S. PATENT DOCUMENTS 5,051,292 9/1991 Katoh et al. ............... 428/480
5,252,388 10/1993 Murooka et al. ............ 428/480

FOREIGN PATENT DOCUMENTS 0345644 12/1989 European Pat. Off. .
0347646 12/1989 European Pat. Off. .
0378154 7/1990 European Pat. Off. .
0453276 10/1991 European Pat. Off. .
0490665 6/1992 European Pat. Off. .
0502745 9/1992 European Pat. Off. .
0524840 1/1993 European Pat. Off. .
0530774 3/1993 European Pat. Off. .

*Primary Examiner*—Morton Foelak
*Attorney, Agent, or Firm*—Sherman and Shalloway

[57] ABSTRACT

There is provided a biaxially oriented polyester base film for a magnetic tape for use in a cassette for a digital audio tape recorder. The film has (a) a stress when the biaxially oriented polyester base film is extended in the longitudinal direction by 5% of at least 12 kg/mm², (b) a residual extension in the longitudinal direction of 0.2 % or less and a residual extension in the transverse direction of 0.3% or less, (c) a heat shrinkage in the longitudinal direction of 1.5% or less, (d) at least one surface of which has a surface roughness, Ra, of 25 nm or less, and (e) a film thickness of in the range of from 3 to 12 μ m. A magnetic tape for use in a cassette for a digital audio tape recorder is also provided.

14 Claims, No Drawings

MAGNETIC TAPE FOR USE IN CASSETTE FOR DIGITAL AUDIO TAPE RECORDER AND BIAXIALLY ORIENTED POLYESTER BASE FILM THEREFOR

The present invention relates to a magnetic tape for use in a cassette for a digital audio tape recorder and a biaxially oriented polyester base film therefor. More specifically, it relates to a magnetic tape which can be used as a magnetic tape for use in a cassette for an audio tape recorder of a digital recording method using a fixed magnetic head such as a magnetic tape for use in a digital-compact cassette (DCC) and which is remarkably free of extension and deformation when used and is highly density recordable; and a biaxially oriented polyester base film therefor.

In recent years, audio cassette tape recorders of a digital recording method excellent in sound quality have been developed as a digital-audio tape recorder (DAT) of a rotary magnetic head method and a digital-compact-cassette tape recorder (DCC) of a fixed magnetic head method. In DCC of a fixed magnetic head method In particular, "azimuth (direction) stabilizing tape guides" are provided above and below the magnetic head for stable tape running, and an "azimuth lock pin" is provided on each side of a tape pad, thereby to secure higher stability, as is described, e.g., in "DCC MD Guide Book" written by MURATA Kinya (issued by Denpa Shinbunsha). In particular, each tape guide has a gradient guide wall, and a tape Is allowed to run with one edge of the tape being pushed to the guide wall surface thereby to force the tape in the direction of the other edge of the tape. As a consequence, the tape stably runs without vibration in the tape width direction. Further, the lock pins constitute a structure with which the tape is reliably kept in contact with the magnetic head. Owing to this structure, one edge of the tape which runs on the gradient wall of the tape guide is forcibly elongated by several percent. Due to this, one edge of the tape may be elongated and the tape may be folded to deteriorate the contact between the tape and a magnetic head (head touch). As a result, recording signals may drop out at a recording time, the output at a play back time may be insufficient, the tape running is rendered unstable, and these defects may cause a trouble that reproduction signals are not accurately readable. Even if a base film for an analog recording tape, which has high strength in the longitudinal direction, is used as a base film for DCC, it is difficult to prevent the extension or deformation of the tape caused by a tensional variation at a start-stop time of the tape. Further, the above base film is Insufficient in the strength in the transverse direction. It is therefore difficult to prevent the above edge damages.

Further, DCC enables high-density recording for digital reproduction and recording, and the magnetic tape surface is hence required to be flatter. The above "DCC-MD Guide Book" describes that the tape used with DCC should be equivalent to a VTR tape of standard type, and the surface is required to be flat. When a digital audio cassette tape has a base film whose surface roughness is greatly decreased for high density recording, the lubricity between film surfaces is poor, and air present between films is poorly released. It is hence difficult to take up the film in the form of a roll. Therefore, the base film is required to have a flat surface and at the same time to have excellent running properties.

On the other hand, generally, the surface of a polyester film used in a conventional analog audio cassette tape has a high roughness, and there are no analog audio cassette tapes which satisfy the above-required properties and can be put to practical use.

Further, an audio cassette tape is increasingly used outdoors or in an automobile in summer seasons, and hence, it is increasingly used in severe-temperature environments. Under the circumstances, an audio cassette tape is required to have excellent heat resistance and undergo no change in properties even in severer environmental change, and it is desired to develop an audio cassette tape whose properties do not change even when it is allowed to stand at a high temperature as high as 90° to 100° C.

It is therefore desired to develop a base film which does not cause the above problems as a substrate for a digital audio cassette tape of a fixed magnetic method, in other words, a base film which is excellent in restorability against extension, excellent In flatness and lubricity and free of change of properties at a high temperature.

It is therefore an object of the present invention to provide a biaxially oriented polyester base film for a magnetic tape for use in a cassette for a digital audio tape recorder.

It is another object of the present invention to provide a biaxially oriented polyester base film for a magnetic tape which is excellent in restorability-one edge of the magnetic tape is extended by the gradient wall of a magnetic head tape guide but then restores its original state -, which exhibits less recording distortion and less output variability and which is excellent in running properties and audio (electromagnetic) characteristics, when used as a magnetic tape for a digital audio tape recorder of a fixed magnetic head method.

It is further another object of the present invention to provide a biaxially oriented polyester base film which gives a magnetic gape having the above properties and having excellent lubricity.

It is still further another object of the present invention to provide a magnetic tape for use in a cassette for a digital audio tape recorder, whose base film is formed of the above biaxially oriented polyester base film of the present invention and which has the above-described properties.

Other objects and advantages of the present invention will be apparent from the following description.

According to the present invention, the above objects and advantages of the present invention are achieved, first, by a biaxially oriented polyester base film for a magnetic tape for use in a cassette for a digital audio tape recorder, characterized in that:

(a) the stress when the biaxially oriented polyester base film is extended in the longitudinal direction by 5 % is at least 12 kg/mm$^2$, (b) the residual extension in the longitudinal direction ls 0.2% or less and the residual extension In the transverse direction is 0.3% or less, (c) the heat shrinkage in the longitudinal direction after a heat treatment under no load at 105° C. for 30 minutes is 1.5% or less, (d) at least one surface of the biaxially oriented polyester base film has a surface roughness, Ra, of 25 nm or less, and (e) the film thickness ls in the range of from 3 to 12 μm.

The biaxially oriented polyester base film of the present invention ls defined by the above five requirements (a) to (e) as described above.

The biaxially oriented polyester base film of the present Invention is required to have a stress of at least 12 kg/mm² when extended in the longitudinal direction by 5%. This stress at the time of 5% extension in the longitudinal direction is preferably adjusted depending upon the recording and play back time of a tape. When the recording and play back time is 60 minutes or less, the above stress is preferably 12 to 15 kg/mm². When the recording and play back time exceeds 60 minutes but does not exceed 90 seconds, the above stress is preferably 15 to 20 kg/mm². When the recording and play back time exceeds 90 minutes but does not exceed 150 minutes, the above stress is preferably 20 kg/mm² or more. Owing to this requirement, the elongation/shrinkage and permanent deformation of the tape at a start-stop time or in electronic editing can be prevented, and the tape can be rapidly restored from deformation. Further, there can be prevented the permanent deformation of one edge of the tape caused by a gradient fixed pin for guiding the tape width. When the stress at the time of 5% extension in the longitudinal direction is less than 12 kg/mm², the tape undergoes elongation and deformation due to the extension at a tape running time or due to the variability of tension at a start-stop time. As a result, the output greatly varies or the sound quality deteriorates. Further, one edge of the tape suffers permanent extension and deformation because of a gradient fixed pin, and the head touch is degraded. As a result, the electromagnetic characteristics become poor.

The biaxially oriented polyester base film of the present invention can be produced by a conventional film forming method in principle. For example, it can be produced by a method in which a dry polyester is melt-extruded, the extrudate is cooled on a casting drum to prepare an unstretched film, and the unstretched film is simultaneously or consecutively biaxially stretched and heat set.

For accomplishing the stress of at least 12 kg/mm² at the time of 5% extension in the longitudinal direction, the unstretched film may be simultaneously stretched in the transverse and longitudinal directions, or it may be consecutively stretched in the transverse and longitudinal directions, with a general stretching roll or a stenter. Further, the unstretched film may be stretched simultaneously or consecutively biaxially stretched at a plurality of steps in each direction. Specifically, the stretching may be carried out by a known method. When the material of the film is a polyester composed of ethylene terephthalate as a main recurring unit, the stretching temperature is generally between 80° and 140° C., the stretch ratio in the longitudinal direction ls 3.0 to 5.0, preferably 3.3 to 4.3, and the stretch ratio in the transverse direction is 3.0 to 5.0, preferably 3.5 to 5.0. The so-obtained biaxially oriented film is heat set at a temperature between 150° and 260° C., preferably between 180° and 250° C., for 1 to 100 seconds.

When the material of the film is a polyester composed of ethylene-2,6-naphthalenedicarboxylate as a main recurring unit, the stretching temperature is generally between (Tg−10) and (Tg+70)° C. (Tg=glass transition temperature of polyester), the stretch ratio in the longitudinal direction ls 5.0 to 10.0, and the stretch ratio in the transverse direction is 3.0 to 8.0. The so-obtained biaxially oriented film is heat set at a temperature between (Tg+70) and Tm° C., for example, at a temperature between 190° and 250° C., for 1 to 100 seconds.

In the biaxially oriented polyester base film of the present invention, the residual extension in the longitudinal direction and the residual extension in the transverse direction are required to be 0.2% or less and 0.3% or less, respectively (requirement (b)). The residual extension in the longitudinal direction is preferably 0.15% or less, more preferably 0.1% or less, particularly preferably 0.05% or less. The residual extension in the transverse direction is preferably 0.25% or less, more preferably 0.2% or less, particularly preferably 0.15% or less. Owing to this requirement, even if one edge of the tape is forcibly extended when the tape rungs on the gradient wall of tape guide of a magnetic head, the tape shows excellent restorability Just after the tape has passed the head. In particular, when the residual extension in the transverse direction is greater than that in the longitudinal direction, the tape shows particularly excellent restorability, the tape has no residual elongation or permanent deformation, the contact of the tape to the head (head touch) is excellent, and the tape is excellent in output characteristics and sound quality. When the residual extension in the longitudinal direction is greater than 0.2% and/or the residual extension in the transverse direction is greater than 0.3%, one edge of the tape undergoes elongation or folding when the tape runs on the gradient wall of tape guide of a magnetic head, and the contact of the tape to the magnetic head (head tough) is poor. As a result, recording signals at a recording time drop out, or the output at a play back time is insufficient.

The residual extension greatly varies depending upon a heat set temperature. It is hence preferred to determine the optimum heat set temperature in advance by measuring the tape for a residual extension in the longitudinal direction, a residual extension in the transverse direction and a stress at the time of 5% extension in the longitudinal direction while changing the heat set temperatures within a proper heat set temperature range and comparing the measurement data.

In the biaxially oriented polyester base film of the present invention, the heat shrinkage in the longitudinal direction is required to be 1.5% or less when the film is heat treated under no load at 105° C. for 30 minutes (requirement (c)). The above heat shrinkage is preferably 1.2% or less, more preferably 1.0% or less. When the above heat shrinkage percentage is too large, the magnetic tape undergoes great deformation when used or stored in a high-temperature atmosphere in summer seasons, etc., and the tape properties are impaired.

The above-specified heat shrinkage under the conditions of 105° C. and 30 minutes can be accomplished by properly selecting heat treatment conditions within the above heat set treatment conditions. Further, it can be also accomplished by passing the above heat set film through two rolls having different revolving rates and subjecting the film to a relaxation treatment at a temperature equal to, or higher than, the glass transition temperature (Tg) of the polyester. However, the method for accomplishing the above heat shrinkage shall not be particularly limited to the above-described methods.

In the biaxially oriented polyester base film of the present invention, the surface roughness, Ra, is in the range of from 5 to 25 nm, preferably 8 to 20 nm (requirement (d)). Owing to this requirement, there can be obtained a cassette tape for a digital audio tape recorder, which does not have a lubricity-imparting back coating but has surface properties equivalent to a VTR tape of a standard type as is described in "DCC-MD Guide Book" by MURATA Kinya (issued by Denpa Shinbunsha). This tape is also excellent in running properties. When the surface roughness, Ra, is greater than 25 nm, the toughened surface of the base film affects a magnetic layer and roughens the magnetic layer as in a conventional cassette tape for an analog audio tape recorder. As a consequence, the electromagnetic characteristics required of a magnetic tape for high-density recording decrease, and drop-out occurs. When Ra is smaller than 5 nm, the base film has too large a friction coefficient, and it is very difficult to handle the film and take up it in the form of a roll. Further, the cassette tape for a digital audio tape recorder is poor in running properties when it has no lubricity-imparting back coating.

In the biaxially oriented polyester base film of the present invention, finally, the thickness is required to be 12 $\mu$m or less (requirement (e)). The preferred film thickness ls determined depending upon the recording and play back time. When the recording and play back time is 60 minutes or less, the film thickness is preferably 9 to 12 $\mu$m. When the recording and play back time exceeds 60 minutes but does not exceed 90 minutes, the film thickness is preferably 6 to 9 $\mu$m. When the recording and play back time exceeds 90 minutes but does not exceed 150 minutes, the film thickness is preferably 4 to 6 $\mu$m. When the film thickness is greater than 12 $\mu$m, the film cannot satisfy the function required of a cassette tape for a compact-size, light-weight, digital audio tape recorder. The lower limit of the film thickness is not specially limited. However, when the film thickness is smaller than 4 $\mu$m, the tape shows insufficient stiffness even if the stress at the time of 5% extension in the longitudinal direction is at least 12 kg/mm$^2$, and the tape has weak stiffness. As a result, the tape shows unstable running properties, and is liable to undergo troubles such as elongation, folding and tangling. Further, when the thickness decreases, the residual extension extremely decreases. In particular, when the film thickness is 3 $\mu$m or less, it is difficult to retain a residual extension of 0.2 or less, and the tape is extended along one edge by a gradient wall of tape guide of a magnetic head. The lower limit of the film thickness is therefore preferably 4 $\mu$m or greater.

For the biaxially oriented polyester base film of the present invention, the stress at the time of 5% extension, the residual extension and the film thickness are preferably selected as follows depending upon the recording and play back time, so that the size and weight can be decreased, and the edge damage, elongation and deformation at a running time and a start stop time can be prevented.

When the recording and play back time is 60 minutes or less, advantageously, the stress at the time of 5% extension in the longitudinal direction is 12 to 15 kg/mm$^2$, the residual extension in the longitudinal direction is preferably 0.15% or less, more preferably 0.10% or less, particularly preferably 0.05% or less, and the film thickness Is 9 to 12 $\mu$m. Further, the residual extension in the transverse direction is preferably 0.2% or less, more preferably 0.15% or less, particularly preferably 0.1% or less.

When the recording and play back time exceeds 60 minutes but does not exceeds 90 minutes, advantageously, the stress at the time of 5% extension in the longitudinal direction is 15 to 20 kg/mm$^2$, the residual extension in the longitudinal direction is preferably 0.15% or less, more preferably 0.10% or less, particularly preferably 0.05% or less, and the film thickness is 6 to 9 $\mu$m. Further, the residual extension in the transverse direction is preferably 0.3% or less, more preferably 0.2% or less, particularly preferably 0.15% or less.

When the recording and play back time exceeds 90 minutes, advantageously, the stress at the time of 5% extension in the longitudinal direction is at least 20 kg/mm$^2$, the residual extension in the longitudinal direction is preferably 0.15% or less, more preferably 0.10% or less, particularly preferably 0.05% or less, and the film thickness is 4 to 6 $\mu$m. Further, the residual extension in the transverse direction is preferably 0.3% or less, more preferably 0.2% or less, particularly preferably 0.15% or less.

The polyester as a raw material for forming the biaxially oriented polyester base film of the present invention is preferably a polyester whose main recurring unit is composed of an ethylene terephthalate unit or an ethylene-2,6-naphthalenedicarboxylate unit.

Examples of the polyester whose main recurring unit is ethylene terephthalate include not only a polyethylene terephthalate homopolymer but also a polyethylene terephthalate copolymer in which at least 80 mol% of the acid component is formed from terephthalic acid and at least 90 mol% of the glycol component is formed from ethylene glycol and a polymer blend containing at least 85% by weight (preferably at least 90% by weight) of polyethylene terephthalate and 15% by weight or less (preferably 10% by weight or less) of other polymer.

Examples of the copolymer-forming acid include aromatic dicarboxylic acids such as naphthalenedicarboxylic acid, isophthalic acid, diphenylsulfonedicarboxylic acid and benzophenonedicarboxylic acid, aliphatic dicarboxylic acids such as succinic acid, adipic acid, sebacic acid and dodecanedicarboxylic acid, and alicyclic dicarboxylic acids such as hexahydroterephthalic acid and 1,3-adamantanedicarboxylic acid. Examples of the copolymer-forming glycol include 1,3-propanediol, 1,4-butanediol, 1,6-hexanediol, neopentyl glycol, 1,4-cyclohexanedimethanol and p-xylylene glycol. Examples of the "other polymer" contained in the polymer blend include polyamide, polyolefin and various polyesters.

Examples of polyester whose main recurring unit Is ethylene-2,6-naphthalenedicarboxylate include not only a polyethylene-2,6-naphthalenedicarboxylate homopolymer but also a polyethylene-2,6-naphthalenedicarboxylate copolymer in which at least 80 mol% of the acid component is formed from 2,6-naphthalenedicarboxylic acid and at least 90 mol% of the glycol component is formed from ethylene glycol and a polymer blend containing at least 85% by weight (preferably at least 90% by weight) of polyethylene-2,6-naphthalenedicarboxylate and 15% by weight or less (preferably 10% by weight or less) of other polymer.

Examples of the copolymer-forming acid include aromatic dicarboxylic acids such as terephthalic acid, isophthalic acid, 2,7-naphthalenedicarboxylic acid, diphenylsulfonedicarboxylic acid and benzophenonedicarboxylic acid, aliphatic dicarboxylic acids such as succinic acid, adipic acid, sebacic acid and dodecanedicarboxylic acid, and alicyclic dicarboxylic acids such as hexahydroterephthalic acid and 1,3-adamantanedicarboxylic acid. Examples of the copolymer-forming glycol include 1,3-propanediol, 1,4-butanediol, 1,6-hexanediol, neopentyl glycol, 1,4-cyclohexanedimethanol and p-xylylene glycol. Examples of the "other polymer" contained in the polymer blend include polyamide, polyolefin and various polyesters.

The above polyester as a raw material may contain a lubricant, a flatting agent, a colorant, a stabilizer and an antioxidant as required.

The above polyester as a raw material is generally produced by a known method according to a melt polymerization method. In the production, additives such as a catalyst may be added as required.

For adjusting the surface roughness, Ra, of the biaxially oriented polyester base film of the present invention, inert fine particles may be added to the polyester as a raw material.

Examples of the above inert fine particles include (1) silicon dioxide; (2) alumina; (3) (4) oxides of Mg, Zn, Zr and Ti; (4) sulfates of Ca and Ba; (5) phosphates of Li, Na and Ca (including monohydrates and dihydrates); (6) benzoates of Li, Na and K; (7) terephthalates of Ca, Ba, Zn and Mn; (8) titanates of Mg, Ca, Ba, Zn, Cd, Pb, Sr, Mn, Fe, Co and Ni; (9) chromates of Ba and Pb; (10) carbon (e.g., carbon black and graphite); (11) glass (e.g., powdered glass and glass beads); and (12) carbonates of Ca and Mg. More preferred are silicic acid anhydride, hydrous silicic acid, alumina, aluminum silicate (including calcined material and hydrates), monolithium phosphate, trilithium phosphate, sodium phosphate, calcium phosphate, barium phosphate, titanium oxide, lithium benzoate and calcium carbonate. Further, fine particles of a heat-resistant polymer such as a silicone resin or crosslinked polystyrene may be used. The above inert fine particles may be used alone or in combination. The above-specified surface roughness can be accomplished by properly determining and adjusting the particle size and particle amount.

The above inert fine particles may be incorporated into the polyester when or after the polyester is polymerized. For example, there may be employed a method in which the inert fine particles are added to the polyester before or during the polymerization of the polyester, a method in which the inert fine particles are kneaded with the polyester when the polymerized polyester is pelletized, or a method in which the inert fine particles are kneaded when the polyester ls melt-extruded in the form of a sheet. Beside the above methods, there may be also employed a method in which a phosphorus component or other necessary component is added at the polymerization time and allowed to precipitate, or a method in which a polymer obtained by this method is blended with a polymer obtained by any one of the above methods.

The biaxially oriented polyester base film of the present invention may have a lubricity-imparting back coating on one surface which is reverse to the surface on which a magnetic layer is to be formed. In this case, preferably, that surface of the film which is reverse to the surface on which a back coating is formed (surface on which a magnetic layer is formed) has an Ra of 8 nm or less. The back coating can be formed by any one of known methods such as the methods disclosed in Japanese Laid-open Patent Publications Nos. 200427/1983 and 248323/1991. More specifically, the back coating is preferably formed by applying a coating solution of a dispersed fine powder additive in a binder to the polyester film or by applying a coating solution of a polymer composition, which forms a lubricant discontinuous coating, to the polyester film. The film to which the coating solution is to be applied may be any one of an unstretched film, a monoaxially stretched film and a biaxially stretched film. After the coating solution is applied, the unstretched film and the monoaxially stretched film are to be subjected to stretching treatment for obtaining a biaxially stretched film. Although not specially limited, the thickness of the backing coating is preferably 2 $\mu$m or less for avoiding influences such as a decrease in output caused by imprinting on a magnetic layer. Further, the surface roughness, Ra, of the back coating is preferably 10 to 30 nm, more preferably 10 to 20 nm, for accomplishing excellent running properties of the magnetic tape and avoiding influences such as a decrease in output caused by imprinting a fine uneven surface of the back coating on a magnetic layer.

When the polyester as a raw material is polyethylene-2,6-naphthalenedicarboxylate, particularly, the biaxially oriented polyester base film of the present invention can be advantageously provided as a biaxially oriented polyester base film which shows a great stress at the time of 5% extension and a small heat shrinkage and has a small thickness.

That is, according to the present invention, there is preferably provided a biaxially oriented polyethylene-2,6-naphthalenedicarboxylate base film for a magnetic tape for use in a cassette for a digital audio tape recorder, characterized in that:

(a') the stress when the biaxially oriented polyester base film is extended in the longitudinal direction by 5% is at least 23 kg/mm$^2$, (b) the residual extension in the longitudinal direction is 0.2% or less and the residual extension in the transverse direction is 0.3% or less, (c) the heat shrinkage in the longitudinal direction after a heat treatment under no load at 105° C. for 30 minutes is 0.5% or less, (d) at least one surface of the biaxially oriented polyester base film has a surface roughness, Ra, of 25 nm or less, and (e') the film thickness is in the range of from 3 to 6 $\mu$m.

The stress at the time of 5% extension in the longitudinal direction is at least 23 kg/mm$^2$, preferably at least 25 kg/mm$^2$ (requirement (a')). Further, the stress at the time of 5% extension in the transverse direction is preferably at least 12 kg/mm$^2$, more preferably at least 15 kg/mm$^2$.

The residual extension in the longitudinal direction is required to be 0.2% or less and the residual extension in the transverse direction be 0.3% or less (requirement (b)). The residual extension in the longitudinal direction is preferably 0.15% or less, more preferably 0.1% or less, particularly preferably 0.05% or less. The residual extension in the transverse direction is preferably 0.2% or less, more preferably 0.15% or less, particularly preferably 0.1% or less.

The heat shrinkage in the longitudinal direction (105° C., 30 minutes, no load) is 0.5% or less, preferably 0.3% or less, more preferably 0.2% or less.

At least one surface of the film has a surface roughness, Ra, of 25 nm or less, preferably in the range of from 5 to 25 nm (requirement (d)).

Further, the film thickness is in the range of from 3 to 6 $\mu$m.

The above preferred biaxially oriented base film formed of polyethylene-2,6-naphthalenedicarboxylate as a raw material may similarly have the above-described back coating.

Studies by the present inventor have also revealed that a film having exactly the same properties as those of the foregoing biaxially oriented polyester base film can be also provided as a laminated film.

That is, the biaxially oriented laminated polyester base film for a magnetic tape for use in a cassette for a digital audio tape recorder is characterized in that:

(a) the stress when the biaxially oriented laminated polyester base film is extended in the longitudinal direction by 5% is at least 12 kg/mm$^2$, (b) the residual extension in the longitudinal direction is 0.2% or less and the residual extension in the transverse direction is 0.3% or less, (c) the heat shrinkage in the longitudinal direction after a heat treatment under no load at 105° C. for 30 minutes is 1.5% or less, (d) a first polyester layer having an Ra of 8 nm or less and a second polyester layer having an Ra in the range of from 8 to 40 nm are outermost layers, and (e) the laminated film thickness is in the range of from 3 to 12 μm.

The above requirements (a), (b), (c) and (e) can be understood on the basis of the explanations of the corresponding requirements of the foregoing biaxially oriented polyester base film of the present invention.

The requirement (d) of the biaxially oriented laminated polyester base film of the present invention is that a first polyester layer having an Ra of 8 nm or less and a second polyester layer having an Ra in the range of from 8 to 40 nm are outermost layers.

The raw material for the first polyester layer and the raw material for the second polyester layer may be the same or different, while these two raw materials are preferably selected from the same polymer. The biaxially oriented laminated polyester base film may have a laminate structure in which at least one third polyester layer is present between the first and second polyester layers. The raw material for the third polyester layer(s) may be the same or different from the raw materials for the first and second polyester layers, while the raw material for the third polyester layer(s) may be selected from the same polymer as the polymers for the first and second polyester layers. Above all, these first to third polyester layers are preferably formed of the same polymer as raw materials.

The biaxially oriented laminated polyester base film of the present invention can be produced by a known film forming method in principle. For example, it can be produced by a method in which dry polyesters for forming the above layers are melted and co-extruded through a die, the extrudate is cooled on a casting drum to prepare an unstretched film, and the unstretched film is simultaneously or consecutively biaxially stretched and heat set. Further, for example, an extrusion laminating method may be used in place of the above co-extrusion method.

The first polyester layer having an Ra of 8 nm or less generally provides a surface on which a magnetic layer is to be formed. The first polyester layer has an Ra in the range of from 1 to 8 nm, preferably in the range of from 3 to 7 nm.

The second polyester layer has an Ra in the range of from 8 to 40 nm, preferably in the range of from 10 to 40 nm, more preferably in the range of from 15 to 40 nm.

Further, concerning the proportions of the first polyester layer and the second polyester layer, the thickness of the second polyester layer is preferably 5 to 50% of the entire thickness of the laminated polyester base film.

When the second polyester layer has too small a thickness, the number of inert particles contained within the layer is small so that the number of protrusions out of the layer surface is small and the number of small protrusions on the surface is small. As a result, the surface roughness is extremely low and the tape shows poor running properties. Further, the coarse particles protrude out of the surface, and the film surface is abraded, which undesirably causes drop-out. On the other hand, when the second polyester layer has too large a thickness, the protrusions of coarse particles within the second polyester layer influence the surface of the first polyester layer so that the surface of the first polyester layer is roughened. As a result, the gap between a magnetic head and the tape increases thereby to decrease the electromagnetic characteristics, which is undesirable for accomplishing high-density recording and high sensitivity. Further, when the second polyester layer has too large a thickness, the amount of particles in the laminated film is large, and the production cost increases, which is undesirable in view of economic performance.

It should be understood that the foregoing preferred embodiments relative to the recording and play back time are also present in the biaxially oriented laminated polyester base film of the present invention.

That is, when the recording and play back time is 60 minutes or less, advantageously, the stress at the time of 5% extension in the longitudinal direction is 12 to 15 kg/mm$^2$, the residual extension in the longitudinal direction is 0.15% or less, and the laminated film thickness is 9 to 12 μm.

When the recording and play back time exceeds 60 minutes but does not exceeds 90 minutes, advantageously, the stress at the time of 5% extension in the longitudinal direction is 15 to 20 kg/mm$^2$, the residual extension in the longitudinal direction is 0.15% or less, and the laminated film thickness is 6 to 9 μm.

When the recording and play back time exceeds 90 minutes, advantageously, the stress at the time of 5% extension in the longitudinal direction is at least 20 kg/mm$^2$, the residual extension in the longitudinal direction is 0.15% or less, and the laminated film thickness is 4 to 6 μm.

The polyester as a raw material for the laminated polyester base film of the present invention is preferably a polyester formed of ethylene terephthalate or ethylene-2,6-naphthalenedicarboxylate as a main recurring unit. This polyester as a raw material is already described.

Further, when the polyester as a raw material is polyethylene-2,6-naphthalenedicarboxylate, the above laminated polyester base film of the present invention can be also provided as a film which shows a great stress at the time of 5% extension and a small heat shrinkage percentage and has a small thickness.

That is, according to the present invention, preferably, there is provided a biaxially oriented laminated polyethylene-2,6-naphthalenedicarboxylate base film for a magnetic tape for use in a cassette for a digital audio tape recorder, characterized in that:

(a') the stress when the biaxially oriented laminated base film is extended in the longitudinal direction by 5% is at least 23 kg/mm$^2$, (b) the residual extension in the longitudinal direction is 0.2% or less and the residual extension in the transverse direction is 0.8 or less, (c') the heat shrinkage in the longitudinal direction after a heat treatment under no load at 105° C. for 30 minutes is 0.5% or less, (d') a first polyester layer having an Ra of 8 nm or less and a second polyester layer having an Ra in the range of from 8 to 40 nm are outermost layers, both the polyesters for the first and second polyester layers being polyethylene-2,6-naphthalenedicarboxylate, and (e') the laminated film thickness is in the range of from 8 to 6 μm.

The above requirements (a'), (b), (c') and (e') can be easily understood on the basis of the explanations of the corresponding requirements of the foregoing biaxially oriented polyester base films of the present invention.

The above requirement (d') is that both the first polyester layer and the second polyester layer are formed of polyethylene-2,6-naphthalenedicarboxylate as a raw material. It should be understood that the explanations of the requirement (d) of the biaxially oriented laminated polyester base film of the present invention can be applied to those points omitted here such as Ra and the proportions of the first and second polyester layers.

The biaxially oriented polyester base film of the present Invention (including the laminated films) gives a magnetic tape for use in a cassette for a digital audio tape recorder when a magnetic layer is formed on one surface thereof.

The above magnetic tape of the present invention may have a lubricity-imparting back coating on that surface on which the magnetic layer is not present. Further, the magnetic tape produced by forming a magnetic layer on the above biaxially oriented polyethylene-2,6-naphthalenedicarboxylate base film (including the laminated film) is preferred as such.

The present invention will be further explained hereinafter with reference to Examples.

The various property values and characteristics used in the present invention were measured and/or are defined as follows.

(1) Stress at the time of 5% extension

A film was cut into a sample having a width of 10 mm and a length of 150 mm, and the sample was tensioned with an Instron type universal tensile tester at an interchuck distance of 100 mm, at a tension rate of 100 mm/minute and at a chart rate of 100 mm/minute. The stress at the time of 5% extension in the resultant load-extension curve was converted to a value per a unit area (m m²).

(2) Residual extension

A film sample having a width of 3/20 inch and a length of 600 mm was placed on the measurement bed of a precision universal projector PJ321F supplied by Mitsutoyo Seisakusho, and one end in the longitudinal direction is fixed. The other end of the film sample was passed over a free roll which was placed in parallel with and aside the sample bed and of which the top portion was positioned at the same level as the level of the sample bed, and the film sample was allowed to come down perpendicularly. A distance of 200 mm between marked points on the film sample on the sample bed was exactly measured. Then, a load of 200 g was applied to the suspended end of the film sample, and after the sample film was allowed to remain in this state for 10 minutes, the load of 200 g was removed and the sample film was further allowed to remain for 10 minutes. Then, the sample film was read for a dimensional change. The residual extension was determined by the following equation, $$\text{Residual extension} = \frac{\Delta S}{S_0} \times 100$$

wherein $S_0$ is a length under no load and $\Delta S$ is an amount of dimensional change caused by the load of 200 g.

(3) Film surface roughness (Ra)

A chart (film surface roughness curve) was prepared with a needle-contacting type surface roughness tester (Surfcoder SE 30C, supplied by Kosaka Laboratories, Ltd.) at a needle radius of 2 μm under a needle pressure of 30 mg. A portion having a measured length L in the direction of its center line was picked up from the film surface roughness curve. The center line of this portion picked up was taken as an X axis, the direction of the length multiplication was taken as a Y axis, and the roughness curve was expressed as Y: f(x). The Ra (μm) given by the following equation was defined as a film surface roughness.

$$Ra = \frac{1}{L} \int_0^L |f(x)| dx$$

(4) Heat shrinkage

A film having a length of about 30 cm and a width of 1 cm, which had been accurately measured for its length in advance, was placed in an oven at 70° C. under no load, and heat-treated for 30 minutes. Then, the film was taken out of the oven, and allowed to stand until it had a room temperature, and the film was measured for a length to determine a dimensional change. The heat shrinkage was determined by the following equation, $$\text{Heat shrinkage} = \frac{\Delta L}{L_0} \times 100$$

wherein $L_0$ is the length before the heat treatment and $\Delta L$ is an amount of the dimensional change.

(5) Running durability of magnetic tape

A coating composition containing 70% by weight of γ-Fe$_2$O$_3$ and 30% by weight of a binder was applied to a binder. The binder contained 5% by weight of urethane rubber, 3.5% by weight of nitrocellulose, 1.5% by weight of vinyl chloride, 90% by weight of methyl ethyl ketone and 15% by weight, based on the resin, of an isocyanate compound as a curing agent. As a result, a roll of a 600 mm wide film coated with a magnetic layer was obtained, and the roll was subjected to 8/20 inch wide micro-slitting with a slitter to give a magnetic tape. While the running of the magnetic tape was started and stopped in a digital audio tape recorder RS-DC10 supplied by Matsushita Electric Industrial Co., Ltd. repeatedly for 100 hours, the magnetic tape was evaluated for running durability as follows.

Evaluation based on three ratings

A: A tape edge is free from elongation and folding. Further, no abrasion dust occurs, and no white dust adheres.

B: A tape edge undergoes crinkling or folding to some extent due to elongation, and a small amount of white dust adheres.

C: A tape edge greatly undergoes elongation and folding. A tape is heavily abraded, and a large amount of white dust occurs.

(6) Taken-up defect-free product percentage

A film was taken up in the form of a roll having a width of 500 mm and a film length of 4,000 mm, and when 100 rolls were prepared in this manner, the number of defect-free rolls expressed as percentage. The "defect-free product" refers to a roll of a film cylindrically taken up, which is free from forming a square form and slackening and free of any wrinkle.

EXAMPLE 1

Polyethylene terephthalate containing 0.2% by weight of calcium carbonate particles whose average particle diameter was 0.8 $\mu$m and having an intrinsic viscosity of 0.65 dl/g (measured in o-chlorophenol at 25° C.) was dried at 160° C., melt-extruded at 280° C. and rapidly cooled/solidified on a casting drum having a temperature of 40° C. to give an unstretched film having a thickness of about 150 $\mu$m.

The above unstretched film was stretched 3.8 times in the longitudinal direction between two rolls having different revolving rates at a temperature of 90° C., further stretched 3.8 times in the transverse direction with a tenter at 90° C., then heat-treated at 200° C. for 30 seconds, cooled at 90° C. for 15 seconds, and taken up to give a biaxially oriented polyethylene terephthalate film having a thickness of 10 $\mu$m.

Then, a magnetic coating composition, whose composition is described in the above (5) "Running durability of magnetic tape", was applied to the above-obtained biaxially oriented polyethylene terephthalate film to obtain a magnetic tape.

Table 1 shows the properties of the above-obtained film and magnetic tape. Table 1 clearly shows that the base film had excellent handling properties and that the magnetic tape was excellent in running durability.

EXAMPLE 2

An unstretched film was obtained in the same manner as in Example 1. The so-obtained unstretched film was stretched 4.5 times in the longitudinal direction between two rolls having different revolving rates at a temperature of 60° C., further stretched 3.5 times in the transverse direction with a tenter at 60° C., and then treated in the same manner as in Example 1 to give a biaxially oriented polyethylene terephthalate film having a thickness of 10 $\mu$m and a magnetic tape.

Table 1 shows the results, which were as excellent as those in Example 1.

EXAMPLE 3

A biaxially oriented polyethylene terephthalate film and a magnetic tape were obtained in the same manner as in Example 1 except that the inert solid particles used in Example 1 were replaced with 0.2% by weight of monodisperse silica particles having an average particle diameter of 0.4 $\mu$m.

Table 1 shows the results, which were as excellent as those in Example 1.

COMPARATIVE EXAMPLE 1

An unstretched film was obtained in the same manner as in Example 1. The so-obtained unstretched film was stretched 3.5 times in the longitudinal direction between two rolls having different revolving rates at a temperature of 90° C., further stretched 3.5 times in the transverse direction with a tenter at 90° C., heat-treated at 170° C. for 30 seconds, and then processed in the same manner as in Example 1 to give a biaxially oriented polyethylene terephthalate film having a thickness of 10 $\mu$m and a magnetic tape.

Table 1 shows the results. Since the base film had a low stress at the time of 5% extension in the longitudinal direction and had a high residual extension, the magnetic tape underwent crinkling and folding while running. Further, since the base film showed a high heat shrinkage, the magnetic tape suffered large deformation when used and stored in a high-temperature atmosphere similar to that of summer seasons. The magnetic tape was therefore not suitable for use as a digital audio tape.

COMPARATIVE EXAMPLE 2

An unstretched film was obtained in the same manner as in Example 1. The so-obtained unstretched film was stretched 3.0 times in the longitudinal direction between two rolls having different revolving rates at a temperature of 90° C., further stretched 4.5 times in the transverse direction with a tenter at 90° C., heat-treated at 200° C. for 30 seconds, and then processed in the same manner as in Example 1 to give a biaxially oriented polyethylene terephthalate film having a thickness of 10 $\mu$m and a magnetic tape.

Table 1 shows the results. The residual extension of the base film was in a proper range, while the stress at the time of 5% extension in the longitudinal direction was low. Therefore, the magnetic tape underwent elongation, crinkling and folding, and was not suitable for use as a digital audio tape.

COMPARATIVE EXAMPLE 3

The same unstretched film as that obtained in Comparative Example 1 was biaxially stretched in the same manner as in Comparative Example 1, and then heat-treated in a tenter at 240° C. for 30 seconds. Thereafter, a biaxially oriented polyethylene terephthalate having a thickness of 10 $\mu$m and a magnetic tape were obtained in the same manner as in Example 1.

Table 1 shows the results. Since the base film had a low stress at the time of 5% extension in the longitudinal direction and had a high residual extension in particular, the magnetic tape greatly underwent crinkling and folding while running and was not suitable for use as a digital audio tape.

EXAMPLE 4

An unstretched film having a thickness of about 130 $\mu$m was obtained in the same manner as in Example 1. The so-obtained unstretched film was stretched 4.7 times in the longitudinal direction between two rolls having different revolving rates at a temperature of 60° C., further stretched 3.5 times in the transverse direction with a tenter at 60° C., and then heat-treated in the same manner as in Example 1 to give a biaxially oriented polyethylene terephthalate film having a thickness of 8 $\mu$m and a magnetic tape whose recording and play back time was 90 minutes.

Table 1 shows the results, which were as excellent as those in Example 1.

EXAMPLE 5

An unstretched film was obtained in the same manner as in Example 1. The so-obtained unstretched film was stretched 2.0 times in the longitudinal direction between two rolls having different revolving rates at a temperature of 70° C., further stretched 3.2 times in the transverse direction with a tenter at 90° C., and then heat-treated at 110° C. by way of an intermediate heat treatment. Thereafter, the heat-treated film was heated with a heating roll at 110° C., and then the heat shrinkage of the film in the longitudinal direction was adjusted to 0.5% by adjusting the tension of the film between the heating roll and a cooling roll. The so-obtained film had a thickness of 6 μm. Then, the film was processed in the same manner as in Example 1 to give a magnetic tape whose recording and play back time was 120 minutes.

Table 1 shows the results, which were as excellent as those in Example 1.

up to give a biaxially oriented polyethylene terephthalate film having a thickness of 10 μm. Then, a coating solution having the following composition was applied to one surface of the film and dried to form a back coating having a thickness of 1.2 μm.

| Composition of coating solution for back coating | |
|---|---|
| Vinyl chloride-vinyl acetate copolymer | 30 parts by weight |
| Acrylonitrile-butadiene rubber | 15 parts by weight |
| Polyisocyanate | 25 parts by weight |
| Calcium carbonate having an average particle diameter of 0.8 μm | 200 parts by weight |
| Methyl ethyl ketone | 650 parts by weight |

Then, a magnetic coating composition, whose composition ls described in the above (5) "Running durability of magnetic tape", was applied to that surface of the above-obtained biaxially oriented polyethylene terephthalate film which had not been coated with the back coating, to obtain an audio cassette tape whose recording and play back time was 60 minutes.

TABLE 1

| | Unit | Ex. 1 | Ex. 2 | Ex. 3 | CEx. 1 | CEx. 2 | CEx. 3 | Ex. 4 | Ex. 5 |
|---|---|---|---|---|---|---|---|---|---|
| ADDED PARTICLES | | | | | | | | | |
| Kind | — | calcium carbonate | calcium carbonate | mono-disperse silica | calcium carbonate | calcium carbonate | calcium carbonate | calcium carbonate | calcium carbonate |
| Particle diameter | μm | 0.8 | 0.8 | 0.4 | 0.8 | 0.8 | 0.8 | 0.8 | 0.8 |
| Amount | wt. % | 0.2 | 0.2 | 0.2 | 0.2 | 0.2 | 0.2 | 0.2 | 0.2 |
| PROPERTIES OF BASE FILM | | | | | | | | | |
| Film thickness | μm | 10 | 10 | 10 | 10 | 10 | 10 | 8 | 6 |
| Surface roughness (Ra) | nm | 16 | 16 | 8 | 16 | 16 | 16 | 16 | 16 |
| Stress at 5% extension MD | kg/mm$^2$ | 13.5 | 14.8 | 13.5 | 11.0 | 9.4 | 10.8 | 17.6 | 22.0 |
| Residual extension MD | % | 0.10 | 0.05 | 0.10 | 0.25 | 0.22 | 0.40 | 0.04 | 0.05 |
| Residual Extension TD | % | 0.10 | 0.14 | 0.10 | 0.25 | 0.04 | 0.42 | 0.14 | 0.18 |
| Heat shrinkage (MD) 105° C. × 30 min. | % | 0.8 | 1.1 | 0.8 | 2.2 | 0.8 | 0.5 | 1.1 | 0.5 |
| Taken-up defect-free product percentage | % | 98 | 98 | 90 | 98 | 98 | 98 | 98 | 98 |
| TAPE PROPERTIES | | | | | | | | | |
| Running durability | — | A | A | A | C | B | C | A | A |

Ex. = Example, CEx. = Comparative Example
MD = machine direction (= longitudinal direction)
TD = transverse direction

EXAMPLE 6

Polyethylene terephthalate containing 0.2% by weight of titanium oxide particles whose average particle diameter was 0.2 μm and having an intrinsic viscosity of 0.65 dl/g (measured in o-chlorophenol at 25° C.) was dried at 160° C., melt-extruded at 280° C. and rapidly cooled/solidified on a casting drum having a temperature of 40° C. to give an unstretched film having a thickness of about 160 μm.

The above unstretched film was stretched 4.0 times in the longitudinal direction between two rolls having different revolving rates at a temperature of 80° C., further stretched 4.0 times in the transverse direction with a tenter at 80° C., then heat-treated at 205° C. for 10 seconds, cooled at 90° C. for 15 seconds, and taken Table 2 shows the properties of the above-obtained film and tape. Table 2 clearly shows that the base film had excellent handling properties and that the magnetic tape was excellent in running durability.

EXAMPLE 7

An unstretched film was obtained in the same manner as in Example 6. The so-obtained unstretched film was stretched 3.7 times in the longitudinal direction between two rolls having different revolving rates at a temperature of 70° C., further stretched 4.3 times in the transverse direction with a tenter at 70° C., and then processed in the same manner as in Example 6 to give a biaxially oriented polyethylene terephthalate film having a thickness of 10 μm and an audio cassette tape.

Table 2 shows the results, which were as excellent as those in Example 6.

COMPARATIVE EXAMPLE 4

An unstretched film was obtained in the same manner as In Example 6. The so-obtained unstretched film was stretched 3.2 times in the longitudinal direction between two rolls having different revolving rates at a temperature of 90° C., further stretched 3.5 times in the transverse direction with a tenter at 90° C., heat-treated at 170° C. for 30 seconds, and then processed in the same manner as in Example 6 to give a biaxially oriented polyethylene terephthalate film having a thickness of 10 μm and an audio cassette tape.

Table 2 shows the results. Since the base film had a low stress at the time of 5% extension in the longitudinal direction and had a high residual extension, the magnetic tape underwent crinkling and folding while running. Further, since the base film showed a high heat shrinkage, the magnetic tape suffered deformation when stored in a high-temperature atmosphere similar to that of summer seasons. The tape was therefore not suitable for use as a digital audio tape.

COMPARATIVE EXAMPLE 5

An unstretched film was obtained in the same manner as in Example 6. The so-obtained unstretched film was stretched 3.2 times in the longitudinal direction between two rolls having different revolving rates at a temperature of 90° C., further stretched 4.5 times in the transverse direction with a tenter at 90° C., heat-treated at 230° C. for 30 seconds, and then processed in the same manner as in Example 6 to give a biaxially oriented polyethylene terephthalate film having a thickness of 10 μm and an audio cassette tape.

Table 2 shows the results. Since the base film had a low stress at the time of 5% extension in the longitudinal direction and had a very high residual extension, the magnetic tape underwent elongation, crinkling and folding while running. Therefore, the tape was not suitable for use as a digital audio tape.

COMPARATIVE EXAMPLE 6

A biaxially oriented polyethylene terephthalate film having a thickness of 10 μm and an audio cassette tape were obtained in the same manner as in Example 6 except that the titanium oxide particles were replaced with 0.005% by weight of monodisperse silica particles having an average particle diameter of 0.01 μm.

Table 2 shows the results. Since the base film had a low surface roughness and showed poor handling properties, the taken-up defect-free product percentage was very poor. Further, the magnetic layer surface of the tape showed poor lubricity and caused abrasion, and the film was not suitable for use as a base for a digital audio tape.

EXAMPLE 8

An unstretched film having a thickness of about 130 μm was obtained in the same manner as in Example 6. The so-obtained unstretched film was stretched 4.8 times in the longitudinal direction between two rolls having different revolving rates at a temperature of 60° C., further stretched 3.7 times in the transverse direction with a tenter at 60° C., and then processed in the same manner as in Example 6 to give a biaxially oriented polyethylene terephthalate film having a thickness of 8 μm and an audio cassette tape whose recording and play back time was 90 minutes.

Table 2 shows the results, which were as excellent as those in Example 6.

COMPARATIVE EXAMPLE 7

A biaxially oriented polyethylene terephthalate film having a thickness of 8 μm and an audio cassette tape whose recording and play back time was 90 minutes were obtained in the same manner as in Example 8 except that the temperature for the heat treatment after the biaxially stretching was changed from 205° C. to 160° C.

Table 2 shows the results. The base film showed a high residual extension, and the tape greatly underwent crinkling and folding while running. The film also had a large heat shrinkage. Therefore, the film was not suitable for use as a base for a digital audio tape.

COMPARATIVE EXAMPLE 8

An unstretched film was obtained in the same manner as in Example 8. The so-obtained unstretched film was stretched 4.0 times in the longitudinal direction between two rolls having different revolving rates at a temperature of 70° C., further stretched 3.5 times in the transverse direction with a tenter at 70° C., heat-treated at 250° C. for 30 seconds, and then processed in the same manner as in Example 8 to give a biaxially oriented polyethylene terephthalate film having a thickness of 8 μm and an audio cassette tape whose recording and play back time was 90 minutes.

Table 2 shows the results. Since the base film had a very high residual extension, the magnetic tape underwent elongation while running, and crinkling and folding took place greatly. Therefore, the tape was not suitable for use as a digital audio tape.

EXAMPLE 9

An unstretched film was obtained in the same manner as in Example 9. The so-obtained unstretched film was stretched 2.0 times in the longitudinal direction between two rolls having different revolving rates at a temperature of 75° C., further stretched 3.4 times in the transverse direction wlth a tenter at 90° C., and then heat-treated at 110° C. by way of an intermediate heat treatment. This film was further stretched 3.6 times In the longitudinal direction at 100 ° C., and then heat-treated at 200° C. Then, this heat-treated film was heated with a heating roll at 100° C., and then the heat shrinkage of the film in the longitudinal direction was adjusted to 0.5% by adjusting the tension of the film between the heating roll and a cooling roll. The so-obtained film had a thickness of 6 μm. Then, the film was processed in the same manner as In Example 6 to give a magnetic tape whose recording and play back time was 120 minutes.

Table 2 shows the results, which were as excellent as those In Example 6.

COMPARATIVE EXAMPLE 9

An unstretched film was obtained in the same manner as in Example 9. The so-obtained unstretched film was stretched 2.2 times in the longitudinal direction between two rolls having different revolving rates at a temperature of 75° C., further stretched 3.0 times in the transverse direction wlth a tenter at 90° C., and heat-treated at 110° C. by way of an Intermediate heat treatment. This film was further stretched 3.6 times in the longitudinal direction at 100° C., and heat-treated at 240° C. to give a film having a thickness of 6 μm. The so-obtained film was processed in the same manner as in Example 8 to give an audio cassette tape whose recording and play back time was 120 minutes.

Table 2 shows the results. Since the base film had a very high residual extension, the tape underwent elongation while running, and crinkling and folding took place greatly. Further, it showed a high heat shrinkage. Therefore, the tape was not suitable for use as a digital audio tape.

ness of the second polyester layer were adjusted by changing the outputs of two extruders. Further, each layer was measured for a thickness by both a fluorescence X-ray method and a method in which a thin piece was taken from the film and an interface was searched for by observing it through a transmitting electron microscope.

Then, a magnetic coating composition, whose composition is described in the above (5) "Running durability of magnetic tape". was applied to the first polyester

TABLE 2

| | Unit | Ex. 6 | Ex. 7 | CEx. 4 | CEx. 5 | CEx. 5 | Ex. 8 | CEx. 7 | CEx. 8 | Ex. 9 | CEx. 9 |
|---|---|---|---|---|---|---|---|---|---|---|---|
| ADDED PARTICLES | | | | | | | | | | | |
| Kind | — | titanium oxide | titanium oxide | titanium oxide | titanium oxide | mono-disperse silica | titanium oxide | titanium oxide | titanium oxide | titanium oxide | titanium oxide |
| Particle diameter | μm | 0.2 | 0.2 | 0.2 | 0.2 | 0.01 | 0.2 | 0.2 | 0.2 | 0.2 | 0.2 |
| Amount | wt. % | 0.08 | 0.08 | 0.08 | 0.08 | 0.005 | 0.08 | 0.08 | 0.08 | 0.08 | 0.08 |
| PROPERTIES OF BASE FILM | | | | | | | | | | | |
| Film thickness | μm | 10 | 10 | 10 | 10 | 10 | 8 | 8 | 8 | 6 | 6 |
| Surface roughness (Ra) | nm | 4.2 | 4.2 | 4.2 | 4.2 | 0.7 | 4.2 | 4.2 | 3.5 | 4.1 | 4.8 |
| Stress at 5% extension MD | kg/mm$^2$ | 14.1 | 13.2 | 9.8 | 10.6 | 13.5 | 18.2 | 14.5 | 13.8 | 23.3 | 20.8 |
| Residual extension MD | % | 0.09 | 0.13 | 0.33 | 0.35 | 0.10 | 0.03 | 0.23 | 0.22 | 0.05 | 0.28 |
| Residual Extension TD | % | 0.09 | 0.08 | 0.25 | 0.07 | 0.10 | 0.11 | 0.31 | 0.35 | 0.15 | 0.42 |
| Heat shrinkage (MD) 105° C. × 30 min. | % | 0.9 | 0.7 | 1.9 | 0.7 | 0.8 | 1.1 | 2.9 | 0.7 | 0.5 | 1.7 |
| Taken-up defect-free product percentage | % | 98 | 98 | 70 | 80 | 20 | 98 | 90 | 70 | 98 | 80 |
| TAPE PROPERTIES | | | | | | | | | | | |
| Running durability | — | A | A | C | C | C | A | C | C | A | C |

Ex. = Example, CEx. = Comparative Example
MD = machine direction (= longitudinal direction)
TD = transverse direction

EXAMPLES 10–11 AND COMPARATIVE EXAMPLES 10–12

Polyethylene terephthalate containing inert particles shown as inert particles for a first polyester layer in Table 3 and having an intrinsic viscosity of 0.65 dl/g (measured in o-chlorophenol at 25° C.) and polyethylene terephthalate containing inert particles shown as inert particles for a second polyester layer in Table B and having an intrinsic viscosity of 0.65 g were respectively dried at 160° C., then melted at 280° C., and co-extruded through a multimanifold type die at a ratio of the second polyester layer thickness/total thickness shown in Table 3. The extrudate was rapidly cooled/-solidified on a casting drum having a temperature of 40° C. to give an unstretched laminated film.

The above-obtained unstretched film was stretched at the stretch ratio shown in Table 3 in the longitudinal direction between two rolls having different revolving rates, and further stretched at the stretch ratio shown in Table 3 in the transverse direction with a tenter. Then, the biaxially stretched film was heat-treated at a heat set temperature shown in Table 3, cooled at 90° C. and then taken up to give a biaxially oriented laminated polyethylene terephthalate film having a thickness of 10 μm. The thickness of the first polyester layer and the thick- layer surface of the above-obtained biaxially oriented laminated polyethylene terephthalate film to obtain an audio cassette tape whose recording and play back time was 60 minutes.

Table 3 shows the properties of the so-obtained films and tapes.

As is clear in Table 3, the films obtained in Examples 10 and 11 were excellent in handling properties, and the tapes obtained in Examples 10 and 11 were excellent in running durability. In contrast, since the films obtained in Comparative Examples 10 to 12 showed a low stress at tile time of 5% extension in the longitudinal direction and/or a high residual extension, the tapes obtained in Comparative Examples 10 to 12 underwent elongation, and the tape edges caused crinkling and folding. Further, in the film obtained in Comparative Example 10, the second polyester layer had a low surface roughness so that the tape showed poor running properties, and the tape was abraded due to coarse protrusions while running. In the film obtained in Comparative Example 11, the first polyester layer and the second polyester layer had high surface roughnesses so that the tape showed a phenomenon of imprinting of the roughness on the magnetic layer. Further, the film obtained in Comparative Example 12 had a low surface roughness so that it was poor in handling properties and showed an extremely poor defect-free product ratio. Therefore, the films obtained in Comparative Examples 10 to 12 were not suitable for use as a base for digital audio tape.

EXAMPLE 12 AND COMPARATIVE EXAMPLES 13 AND 14

An unstretched laminated film of which the first polyester layer contained inert particles shown in Table 3 and the second polyester layer contained inert particles shown in Table 3 was obtained in the same manner as in Example 10. The unstretched laminated film was stretched and heat set under the conditions shown in Table 3 and cooled in the same manner as in Example 10, and the stretched laminated film was processed in the same manner as in Example 10 to give a biaxially oriented laminated polyethylene terephthalate film having a thickness of 8 μm and an audio cassette tape whose recording and play back time was 90 minutes.

Table 3 shows the results of the so-obtained films and tapes. The results of the film obtained in Example 12 were as excellent as those in Example 10. The films obtained in Comparative Examples 13 and 14 had a low stress at the time: of 5% extension in the longitudinal direction and a high residual extension so that the tapes underwent elongation or the tape edges caused crinkling and folding. In particular, the film obtained in Comparative Example 13 showed a large heat shrinkage, and the tape underwent great deformation when stored in a high-temperature atmosphere similar to that of summer seasons and was therefore not suitable for use as a digital audio tape.

EXAMPLE 13 AND COMPARATIVE EXAMPLE 15

An unstretched laminated film of which the first polyester layer contained Inert particles shown in Table 3 and the second polyester layer contained inert particles shown in Table 3 was obtained in the same manner as in Example 10. The unstretched laminated film was stretched and heat set under the conditions shown in Table 3 to give a biaxially oriented laminated polyethylene terephthalate film having a thickness of 6 μm and an audio cassette tape whose recording and play back time was 120 minutes. In Example 13, the heat-set biaxially oriented film was heated to 100° C. with a heating roll, and then the heat shrinkage of the film in the longitudinal direction was adjusted to 0.5% by adjusting the tension of the film between the heating roll and a cooling roll. In Comparative Example 15, the above adjustment was not carried out.

Table 3 shows the results. The results of the film obtained in Example 13 were as excellent as those in Example 10. The film obtained in Comparative Example 15 had an insufficient stress at the time of 5% extension in the longitudinal direction and a high residual extension so that the tape underwent elongation or the tape edge caused crinkling and folding. Further, the film obtained in Comparative Example 15 had a course surface of the first polyester layer and showed a large heat shrinkage, and it was therefore not suitable for use as a digital audio tape.

TABLE 3

| | Unit | Ex. 10 | Ex. 11 | CEx. 10 | CEx. 11 | CEx. 12 | Ex. 12 |
|---|---|---|---|---|---|---|---|
| STRETCH RATIO | | | | | | | |
| Lengthwise | — | 4.1 | 4.1 | 3.2 | 3.2 | 3.9 | 5.0 |
| Widthwise | — | 3.9 | 3.9 | 3.5 | 4.5 | 3.8 | 3.6 |
| Lengthwise (re-stretched) | — | — | — | — | — | — | — |
| Heat-set temp. | °C. | 200 | 200 | 200 | 220 | 175 | 200 |
| INERT PARTICLES FOR FIRST POLYESTER LAYER | | | | | | | |
| Kind | — | mono-disperse silica | mono-disperse silica | mono-disperse silica | mono-disperse silica | mono-disperse silica | mono-disperse silica |
| Particle diameter | μm | 0.2 | 0.2 | 0.2 | 0.2 | 0.01 | 0.2 |
| Amount | wt. % | 0.07 | 0.07 | 0.1 | 0.1 | 0.005 | 0.1 |
| INERT PARTICLES FOR SECOND POLYESTER LAYER | | | | | | | |
| Kind | — | calcium carbonate | calcium carbonate | calcium carbonate | calcium carbonate | mono-disperse silica | calcium carbonate |
| Particle diameter | μm | 0.8 | 1.2 | 1.2 | 1.2 | 02 | 1.2 |
| Amount | wt. % | 0.15 | 0.1 | 0.1 | 0.25 | 0.1 | 0.1 |
| Kind | — | — | mono-disperse silica | mono-disperse silica | mono-disperse silica | — | mono-disperse silica |
| Particle diameter | μm | — | 0.4 | 0.4 | 0.4 | — | 0.4 |
| Amount | wt. % | — | 0.15 | 0.15 | 0.15 | — | 0.15 |
| Ratio of second layer thickness/total thickness | % | 10 | 10 | 2 | 80 | 10 | 10 |
| PROPERTIES OF BASE FILM | | | | | | | |
| Total film thickness | μm | 10 | 10 | 10 | 10 | 10 | 8 |
| Surface roughness (Ra) | | | | | | | |
| First polyester layer | nm | 3.8 | 3.8 | 4.7 | 10.5 | 0.7 | 4.2 |
| Second polyester layer | nm | 17.2 | 27.5 | 9.2 | 45.0 | 5.2 | 27.5 |
| Stress at 5% extension MD | kg/mm² | 14.2 | 14.2 | 11.4 | 10.6 | 12.4 | 19.1 |
| Residual extension MD | % | 0.08 | 0.08 | 0.29 | 0.35 | 0.30 | 0.03 |
| Residual extension TD | % | 0.09 | 0.09 | 0.21 | 0.07 | 0.35 | 0.15 |
| Heat shrinkage (MD) 105° C. × 30 min. | % | 1.0 | 1.0 | 0.9 | 0.7 | 1.8 | 1.1 |
| Taken-up defect-free product percentage | % | 98 | 98 | 90 | 80 | 20 | 98 |
| TAPE PROPERTIES | | | | | | | |

TABLE 3-continued

| Running durability | — | A | A | C | C | C | A |
|---|---|---|---|---|---|---|---|
| | | Unit | CEx. 13 | CEx. 14 | Ex. 13 | CEx. 15 |
| STRETCH RATIO | | | | | | |
| Lengthwise | | — | 5.0 | 4.0 | 2.0 | 2.0 |
| Widthwise | | — | 3.6 | 3.8 | 3.5 | 3.5 |
| Lengthwise (re-stretched) | | — | — | — | 3.6 | 3.6 |
| Heat-set temp. | | °C. | 160 | 250 | 200 | 250 |
| INERT PARTICLES FOR FIRST POLYESTER LAYER | | | | | | |
| Kind | | — | mono-disperse silica | mono-disperse silica | mono-disperse silica | mono-disperse silica |
| Particle diameter | | μm | 0.2 | 0.2 | 0.2 | 0.2 |
| Amount | | wt. % | 0.1 | 0.1 | 0.1 | 0.1 |
| INERT PARTICLES FOR SECOND POLYESTER LAYER | | | | | | |
| Kind | | — | calcium carbonate | calcium carbonate | calcium carbonate | calcium carbonate |
| Particle diameter | | μm | 1.2 | 1.2 | 1.2 | 1.2 |
| Amount | | wt. % | 0.1 | 0.1 | 0.1 | 0.1 |
| Kind | | — | mono-disperse silica | mono-disperse silica | mono-disperse silica | mono-disperse silica |
| Particle diameter | | μm | 0.4 | 0.4 | 0.4 | 0.4 |
| Amount | | wt. % | 0.15 | 0.15 | 0.15 | 0.15 |
| Ratio of second layer thickness/total thickness | | % | 10 | 10 | 10 | 90 |
| PROPERTIES OF BASE FILM | | | | | | |
| Total film thickness | | μm | 8 | 8 | 6 | 6 |
| Surface roughness (Ra) | | | | | | |
| First polyester layer | | nm | 4.2 | 4.3 | 4.0 | 9.5 |
| Second polyester layer | | nm | 25.8 | 25.8 | 27.5 | 27.5 |
| Stress at 5% extension MD | | kg/mm$^2$ | 14.8 | 13.3 | 23.3 | 18.5 |
| Residual extension MD | | % | 0.21 | 0.26 | 0.05 | 0.23 |
| Residual extension TD | | % | 0.38 | 0.30 | 0.14 | 0.40 |
| Heat shrinkage (MD) 105° C. × 30 min. | | % | 3.5 | 0.7 | 0.5 | 1.8 |
| Taken-up defect-free product percentage | | % | 90 | 70 | 98 | 80 |
| TAPE PROPERTIES | | | | | | |
| Running durability | | — | C | C | A | C |

Ex. = Example, CEx. = Comparative Example
MD = machine direction (= longitudinal direction)
TD = transverse direction

EXAMPLE 14

Polyethylene-2,6-naphthalenedicarboxylate containing 0.3% by weight of calcium carbonate whose average particle diameter was 0.75 μm and having an intrinsic viscosity of 0.62 dl/g (measured in o-chlorophenol at 25° C.) was dried at 170° C., melt-extruded at 300° C. and rapidly cooled/solidified on a casting drum having a temperature of 60° C. to give an unstretched film having a thickness of about 170 μm.

The above unstretched film was stretched 6 times in the longitudinal direction between two rolls having different revolving rates at a temperature of 125° C., further stretched 4.5 times in the transverse direction with a tenter at 125° C., and then heat-treated at 200° C. for 10 seconds. Further, the above biaxially stretched film was subjected to a floating heat treatment in an oven at 110° C. thereby to adjust the heat shrinkage in the longitudinal direction to 0.3 %. There was accordingly obtained a biaxially oriented polyethylene-2,6-naphthalenedicarboxylate film having a thickness of 6 μm.

Then, a magnetic coating composition, whose composition Is described in the above (5) "Running durability of magnetic tape", was applied to the above-obtained biaxially oriented polyethylene terephthalate film to obtain an audio cassette tape.

Table 4 shows the properties of the above-obtained film and audio cassette tape. Table 4 clearly shows that the base film was excellent in handling properties and that the audio cassette tape was excellent in running durability.

EXAMPLE 15

A biaxially oriented polyethylene-2,6-naphthalenedicarboxylate film having a thickness of 6 μm and an audio cassette tape were obtained in the same manner as in Example 14 except that the calcium carbonate particles were replaced with 0.25% by weight of monodisperse silica having an average particle diameter of 0.35 μm and that the heat set temperature was changed to 220° C.

Table 4 shows the results, which were as excellent as those in Example 14.

EXAMPLE 16

An unstretched film was obtained in the same manner as in Example 14, and this unstretched film was stretched 2.3 times in the longitudinal direction between two rolls having different revolving rates at a temperature of 130° C., further stretched 4.3 times in the transverse direction with a tenter at 130° C., and then heat-treated at 160° C. by way of an intermediate heat treatment. Further, this film was stretched 3.0 times in the longitudinal direction at 170° C., stretched 1.2 times in the transverse direction at 170° C., then heat-treated at 215° C., and further subjected to the same floating heat treatment as that in Example 14 to give a biaxially oriented polyethylene-2,6naphthalenedicarboxylate film having a thickness of 4 μm and an audio cassette tape whose recording and play back time was 180 minutes.

Table 4 shows tile results, which were as excellent as those in Example 14.

COMPARATIVE EXAMPLE 16

An unstretched film was obtained in the same manner as in Example 14. and a biaxially oriented polyethylene-2,6-naphthalenedicarboxylate film having a thickness of 6 μm and an audio cassette tape were obtained in the same manner as in Example 14 except that the unstretched film was stretched 4.8 times in the longitudinal-direction between two rolls having different revolving rates at a temperature of 125° C., further stretched 4.0 times in the transverse direction with a tenter at 125° C. and then heat-treated at 200° C. for 10 seconds and that no floating heat treatment was carried out.

Table 4 shows the results. The base film particularly had a high residual extension so that the tape greatly caused crinkling and folding while running, and it showed a high heat shrinkage so that the tape underwent large deformation when used and stored in a high-temperature atmosphere similar to that of summer seasons. Therefore, the tape was not suitable for use as a digital audio tape.

COMPARATIVE EXAMPLE 17

An unstretched film was obtained in the same manner as in Example 14, and a biaxially oriented polyethylene-2,6-naphthalenedicarboxylate film having a thickness of 6 μm and an audio cassette tape were obtained in the same manner as in Example 14 except that the unstretched film was stretched 4.5 times in the longitudinal direction between two rolls having different revolving rates at a temperature of 130° C., further stretched 7.5 times in the transverse direction with a tenter at 130° C., and then heat-treated at 200° C. for 30 seconds and that no floating heat treatment was carried out.

Table 4 shows the results. The base film particularly had a high residual extension in the longitudinal direction so that the tape underwent elongation and caused crinkling and folding while running, and the tape was therefore not suitable for use as a digital audio tape.

COMPARATIVE EXAMPLE 18

A biaxially oriented polyethylene-2,6-naphthalenedicarboxylate film having a thickness of 4 μm and an audio cassette tape were obtained in the same manner as in Example 16 except that no floating heat treatment was carried out.

Table 4 shows the results. The base film showed a high residual extension in each of the longitudinal and transverse directions, so that the tape greatly caused crinkling and folding while running, and the tape was therefore not suitable for use as a digital audio tape.

COMPARATIVE EXAMPLE 19

A biaxially oriented polyethylene-2,6-naphthalenedicarboxylate film having a thickness of 6 μm and an audio cassette tape were obtained in the same manner as in Example 14 except that the calcium carbonate particles were replaced with 0.05% by weight of monodisperse silica particles having an average particle diameter of 0.05 μm, that the unstretched film was stretched 4.0 times in the transverse direction, that the time for the heat treatment was changed to 30 seconds and that no floating heat treatment was carried out.

Table 4 shows the results. The base film had a high residual extension so that the tape underwent elongation while running and greatly caused crinkling and folding.

TABLE 4

|  | Unit | Ex. 14 | Ex. 15 | Ex. 16 | CEx. 16 | CEx. 17 | CEx. 18 | CEx. 19 |
| --- | --- | --- | --- | --- | --- | --- | --- | --- |
| ADDED PARTICLES |  |  |  |  |  |  |  |  |
| Kind | — | calcium carbonate | mono-disperse silica | calcium carbonate | calcium carbonate | calcium carbonate | calcium carbonate | mono-disperse silica |
| Particle diameter | μm | 0.75 | 0.35 | 0.75 | 0.75 | 0.75 | 0.75 | 0.05 |
| Amount | wt. % | 0.3 | 0.25 | 0.3 | 0.3 | 0.3 | 0.3 | 0.05 |
| PROPERTIES OF BASE FILM |  |  |  |  |  |  |  |  |
| Film thickness | μm | 6 | 6 | 4 | 6 | 6 | 4 | 6 |
| Surface roughness (Ra) | nm | 14 | 7 | 12 | 16 | 15 | 16 | 3 |
| Stress at 5% extension MD | kg/mm$^2$ | 24.8 | 23.8 | 35.3 | 17.9 | 14.0 | 25.6 | 20.8 |
| Stress at 5% extension TD | kg/mm$^2$ | 16.1 | 15.6 | 18.7 | 12.4 | 27.4 | 14.3 | 10.8 |
| Residual extension MD | % | 0.12 | 0.09 | 0.08 | 0.25 | 0.25 | 0.21 | 0.18 |
| Residual Extension TD | % | 0.18 | 0.10 | 0.18 | 0.27 | 0.14 | 0.32 | 0.23 |
| Heat shrinkage (MD) 105° C. × 30 min. | % | 0.3 | 0.2 | 0.3 | 0.8 | 0.6 | 0.4 | 1.5 |
| Take-up defect-free product percentage | % | 98 | 98 | 90 | 98 | 98 | 98 | 30 |
| TAPE PROPERTIES |  |  |  |  |  |  |  |  |
| Running | — | A | A | A | C | B | C | C |

TABLE 4-continued

| | Unit | Ex. 14 | Ex. 15 | Ex. 16 | CEx. 16 | CEx. 17 | CEx. 18 | CEx. 19 |
|---|---|---|---|---|---|---|---|---|
| durability | | | | | | | | |

Ex. = Example, CEx. = Comparative Example
MD = machine direction (= longitudinal direction)
TD = transverse direction

EXAMPLE 17

Polyethylene-2,6-naphthalenedicarboxylate containing 0.10% by weight of monodisperse silica particles whose average particle diameter was 0.12 μm and having an intrinsic viscosity of 0.62 dl/g (measured in o-chlorophenol at 25° C.) was dried at 170° C., melt-extruded &t 300° C. and rapidly cooled on a casting drum having a temperature of 60° C. to give an unstretched film having a thickness of about 160 μm.

The above unstretched film was stretched 5.8 times in the longitudinal direction between two rolls having different revolving rates at a temperature of 125° C., further stretched 4.5 times in the transverse direction with a tenter at 125° C., and then heat-treated at 200° C. for 10 seconds. Further, the above biaxially stretched film was subjected to a floating heat treatment in an oven at 110° C. thereby to adjust the heat shrinkage in the longitudinal direction to 0.3%. There was accordingly obtained a biaxially oriented polyethylene-2,6-naphthalenedicarboxylate film having a thickness of 6 μm. Then, the same back coating composition as that used in Example 6 was applied to one surface of the above-obtained biaxially oriented polyethylene terephthalate film to form a back coating having a thickness of 1.2 μm.

Then, a magnetic coating composition, whose composition is described in the above (5) "Running durability of magnetic tape", was applied to the above-obtained biaxially oriented polyethylene-2,6-naphthalenedicarboxylate film to obtain an audio cassette tape whose recording and play back time was 120 minutes.

Table 5 shows the properties of the above film and audio cassette tape. Table 5 clearly shows that the base film was excellent in handling properties and that the magnetic tape was excellent in running durability.

EXAMPLE 18

An unstretched film was obtained in the same manner as in Example 17. and this unstretched film was stretched 2.2 times in the longitudinal direction between two rolls having different revolving rates at a temperature of 130° C., further stretched 4.1 times in the transverse direction with a tenter at 130° C., and then heat-treated at 160° C. by way of an intermediate heat treatment. Further, this film was stretched 3.2 times in the longitudinal direction at 170° C., stretched 1.2 times in the transverse direction at 170° C., then heat-treated at 215° C., and further subjected to the same floating heat treatment as that in Example 17 to give a biaxially oriented polyethylene-2,6-naphthalenedicarboxylate film having a thickness of 4 μm and an audio cassette tape whose recording and play back time was 180 minutes.

Table 5 shows the results, which were as excellent as those in Example 17.

COMPARATIVE EXAMPLE 20

A biaxially oriented polyethylene-2,6-naphthalenedicarboxylate film having a thickness of 6 μm and an audio cassette tape were obtained in the same manner as in Example 17 except that the unstretched film was stretched 5.0 times in the longitudinal direction between two rolls having different revolving rates at a temperature of 125° C., further stretched 4.2 times in the transverse direction with a tenter at 125° C., and then heat-treated at 205° C. for 10 seconds and that no floating heat treatment was carried out.

Table 5 shows the results. The base film had a high residual extension so that the tape greatly caused crinkling and folding while running, and it showed a high heat shrinkage so that the tape underwent large deformation when used and stored in a high-temperature atmosphere similar to that of summer seasons. Therefore, the tape was not suitable for use as a digital audio tape.

COMPARATIVE EXAMPLE 21

A biaxially oriented polyethylene-2,6-naphthalenedicarboxylate film having a thickness of 4 μm and an audio cassette tape were obtained in the same manner as in Example 18 except that the stretched film was heat-treated at 250° C. for 30 seconds and that no floating heat treatment was carried out.

Table 5 shows the results. The base film had a high residual extension in each of the longitudinal and transverse directions so that the tape edge greatly caused crinkling and folding while the tape was running, and the tape was therefore not suitable for use as a digital audio tape.

COMPARATIVE EXAMPLE 22

A biaxially oriented polyethylene-2,6-naphthalenedicarboxylate film having a thickness of 6 μm and an audio cassette tape were obtained in the same manner as in Example 17 except that the silica particles were replaced with 0.01% by weight of monodisperse silica particles having an average particle diameter of 0.01 μm, that the heat treatment was carried out at 160° C. for 30 seconds and that no floating heat treatment was carried out.

Table 5 shows the results. The base film had a high residual extension so that the tape greatly caused crinkling and folding while running, and the film was therefore not suitable for use as a base for a digital audio tape.

TABLE 5

| | Unit | Ex. 17 | Ex. 18 | CEx. 20 | CEx. 21 | CEx. 22 |
|---|---|---|---|---|---|---|
| ADDED PARTICLES | | | | | | |
| Kind | — | mono-disperse silica | mono-disperse silica | mono-disperse silica | mono-disperse silica | mono-disperse silica |

TABLE 5-continued

| | Unit | Ex. 17 | Ex. 18 | CEx. 20 | CEx. 21 | CEx. 22 |
|---|---|---|---|---|---|---|
| Particle diameter | μm | 0.12 | 0.12 | 0.12 | 0.12 | 0.01 |
| Amount | wt. % | 0.10 | 0.10 | 0.10 | 0.10 | 0.01 |
| PROPERTIES OF BASE FILM | | | | | | |
| Film thickness | μm | 6 | 4 | 6 | 4 | 6 |
| Surface roughness (Ra) | nm | 4.5 | 4.2 | 4.5 | 4.5 | 0.8 |
| Stress at 5% extension MD | kg/mm² | 23.5 | 34.4 | 18.5 | 26.4 | 19.5 |
| Stress at 5% extension TD | kg/mm² | 17.0 | 17.5 | 14.2 | 12.0 | 13.5 |
| Residual extension MD | % | 0.12 | 0.09 | 0.22 | 0.20 | 0.28 |
| Residual Extension TD | % | 0.18 | 0.10 | 0.30 | 0.34 | 0.36 |
| Heat shrinkage (MD) 105° C. × 30 min. | % | 0.3 | 0.2 | 0.8 | 0.5 | 1.5 |
| Take-up defect-free product percentage | % | 98 | 98 | 98 | 98 | 30 |
| TAPE PROPERTIES | | | | | | |
| Running durability | — | A | A | C | C | C |

Ex. = Example, CEx. = Comparative Example
MD = machine direction (= longitudinal direction)
TD = transverse direction

EXAMPLES 19-20 AND COMPARATIVE EXAMPLES 23-25

Pellets of polyethylene-2,6-naphthalenedicarboxylate containing lubricant particles shown as particles for a first polyester layer in Table 6 and having an intrinsic viscosity of 0.62 dl/g (measured in o-chlorophenol at 25° C.) and pellets of the same polyethylene-2,6-naphthalenedicarboxylate containing lubricant particles shown as particles for a second polyester layer in Table 6 were respectively dried at 170° C., then melted at 300° C., and co-extruded through a multimanifold type die at the ratio of the second polyester layer thickness/total thickness shown in Table 6. The extrudate was rapidly cooled/solidified on a casting drum having a temperature of 60° C. to give an unstretched laminated film having a thickness of approximately 130 to 170 μm.

The above-obtained unstretched film was stretched at a stretch ratio shown in Table 6 in the longitudinal direction between two rolls having different revolving rates, and further stretched at a stretch ratio shown in Table 6 in the transverse direction with a tenter. Then, the biaxially stretched film was heat-treated at a heat set temperature shown in Table 6. Except for Comparative Example 23, the heat-treated film was further subjected to a floating heat treatment in an oven at 110° C., thereby to adjust the heat shrinkage in the longitudinal direction to 0.2%. Then, the resultant biaxially oriented laminated polyethylene-2,6-naphthalenedicarboxylate film having a thickness of 6 μm was taken up. In Comparative Example 23, a biaxially oriented laminated film having a thickness of 6 μm was similarly taken up without carrying out the above floating heat treatment. Each of the thickness of the first polyester layer and the thickness of the second polyester layer were adjusted by changing the outputs of two extruders. Further, each layer was measured for a thickness by both & fluorescence X-ray method and a method in which a thin piece was taken from the film and an interface was searched for by observing it through & transmitting electron microscope.

Then, a magnetic coating composition, whose composition is described in the above (5) "Running durability of magnetic tape", was applied to the first polyester layer surface of the above-obtained biaxially oriented laminated film to obtain an audio cassette tape whose recording and play back time was 120 minutes.

Table 6 shows the properties of the so-obtained films and tapes. As is clear in Table 6, the base films obtained in Examples 19 and 20 were excellent in handling properties, and the tapes obtained in Examples 19 and 20 were excellent in running durability. In contrast, the films obtained in Comparative Examples 23 to 25 had a high residual extension so that the tape underwent elongation while running and caused crinkling and folding. These results show that all the tapes obtained in Comparative Examples 23 to 25 were not suitable for use as a digital audio tape.

EXAMPLE 21 AND COMPARATIVE EXAMPLE 26

An unstretched laminated polyethylene-2,6-naphthalenedicarboxylate film of which the first polyester layer contained inert particles shown in Table 6 and the second polyester layer contained inert particles shown in Table 6 was obtained in the same manner as in Example 19. The unstretched laminated film was biaxially stretched at stretch ratios shown in Table 6, and heat set at a heat set temperature shown in Table 6. In Example 21, the stretched laminated film was subjected to the same floating heat treatment as that in Example 19 thereby to adjust the heat shrinkage in the longitudinal direction to 0.2%, while, in Comparative Example 26, the above floating heat treatment was not carried out. Biaxially oriented laminated polyethylene-2,6-naphthalenedicarboxylate films having a thickness of 4 μm were obtained, respectively.

A magnetic coating composition was applied to the first polyester layer surface of each film in the same manner as in Example 19 to give audio cassette tapes whose recording and play back time was 180 minutes.

Table 6 shows the results. The results of the film obtained in Example 21 were as excellent as those in Example 19. The film obtained in Comparative Example 26 had a high residual extension in each of the longitudinal and transverse directions so that the tape edges caused crinkling and folding while the tape was running. Further, the film obtained in Comparative Example 26 showed a large heat shrinkage so that the tape underwent great deformation in a high-temperature atmosphere. Further, since the thickness ratio of the second polyester layer was high, undesirably, the surface of the first polyester layer was roughened.

TABLE 6

| | Unit | Ex. 19 | Ex. 20 | CEx. 23 | CEx. 24 | CEx. 25 | Ex. 21 | CEx. 26 |
|---|---|---|---|---|---|---|---|---|
| STRETCH RATIO | | | | | | | | |
| Lengthwise | — | 6.0 | 2.2 | 5.5 | 4.5 | 6.0 | 2.2 | 6.0 |
| Widthwise | — | 4.3 | 3.9 | 4.2 | 5.0 | 4.3 | 3.85 | 4.3 |
| Lengthwise (re-stretched) | — | — | 2.8 | — | — | — | 3.2 | — |
| Widthwise (re-stretched) | — | — | 1.15 | — | — | — | 1.2 | — |
| Heat-set temp. | °C. | 210 | 210 | 160 | 200 | 250 | 220 | 180 |
| INERT PARTICLES FOR FIRST POLYESTER LAYER | | | | | | | | |
| Kind | — | mono-disperse silica | mono-disperse silica | mono-disperse silica | mono-disperse silica | mono-disperse silica | mono-disperse silica | mono-disperse silica |
| Particle diameter | μm | 0.2 | 0.2 | 0.2 | 0.2 | 0.2 | 0.2 | 0.2 |
| Amount | wt. % | 0.07 | 0.07 | 0.07 | 0.07 | 0.07 | 0.07 | 0.07 |
| INERT PARTICLES FOR SECOND POLYESTER LAYER | | | | | | | | |
| Kind | — | calcium carbonate | calcium carbonate | calcium carbonate | mono-disperse silica | Silica | calcium carbonate | calcium carbonate |
| Particle diameter | μm | 0.8 | 0.8 | 0.8 | 0.2 | 1.0 | 0.8 | 0.8 |
| Amount | wt. % | 0.15 | 0.15 | 0.15 | 0.07 | 0.5 | 0.15 | 0.15 |
| Kind | — | mono-disperse silica | mono-disperse silica | mono-disperse silica | — | — | mono-disperse silica | mono-disperse silica |
| Particle diameter | μm | 0.2 | 0.2 | 0.2 | — | — | 0.2 | 0.2 |
| Amount | wt. % | 0.07 | 0.07 | 0.07 | — | — | 0.07 | 0.07 |
| Ratio of second layer thickness/total thickness | % | 10 | 10 | 10 | 10 | 80 | 10 | 90 |
| PROPERTIES OF BASE FILM | | | | | | | | |
| Total film thickness | μm | 6 | 6 | 6 | 6 | 6 | 4 | 4 |
| Surface roughness (Ra) | | | | | | | | |
| First polyester layer | nm | 4.0 | 3.7 | 4.4 | 0.8 | 12.1 | 3.5 | 10.5 |
| Second polyester layer | nm | 24.1 | 23.6 | 24.8 | 9.7 | 48.0 | 22.7 | 24.3 |
| Stress at 5% extension MD | kg/mm² | 24.4 | 25.7 | 20.8 | 14.8 | 21.6 | 27.5 | 23.4 |
| Stress at 5% extension TD | kg/mm² | 14.6 | 16.3 | 12.4 | 17.3 | 12.0 | 16.2 | 12.5 |
| Residual extension MD | % | 0.11 | 0.09 | 0.32 | 0.22 | 0.27 | 0.09 | 0.25 |
| Residual extension TD | % | 0.19 | 0.18 | 0.41 | 0.17 | 0.39 | 0.12 | 0.32 |
| Heat shrinkage (MD) 105° C. × 30 min. | % | 0.2 | 0.2 | 1.6 | 0.2 | 0.2 | 0.2 | 1.1 |
| Taken-up defect-free product percentage | % | 98 | 98 | 98 | 30 | 80 | 98 | 98 |
| TAPE PROPERTIES | | | | | | | | |
| Running durability | — | A | A | C | C | C | A | C |

Ex. = Example, CEx. = Comparative Example
MD = machine direction (= longitudinal direction)
TD = transverse direction

What is claimed is:

1. A biaxially oriented laminated polyester base film for a magnetic tape for use in a cassette for a digital audio tape recorder, characterized in that:
   (a) the stress when the biaxially oriented laminated polyester base film is extended in the longitudinal direction by 5% is at least 12 kg/mm²,
   (b) the residual extension in the longitudinal direction is 0.2% or less and the residual extension in the transverse direction is 0.3% or less,
   (c) the heat shrinkage in the longitudinal direction after a heat treatment under no load at 105° C. for 30 minutes is 1.5% or less,
   (d) a first polyester layer having an Ra of 8 nm or less and a second polyester layer having an Ra in the range of from 8 to 40 nm are outermost layers, and
   (e) the laminated film thickness is in the range of from 3 to 12 μm.

2. The biaxially oriented laminated polyester base film of claim 1, wherein the first polyester layer provides a surface on which a magnetic layer is to be formed.

3. The biaxially oriented laminated polyester base film of claim 1, wherein the second polyester layer has an Ra in the range of from 10 to 40 nm.

4. The biaxially oriented laminated polyester base film of claim 1, wherein the second polyester layer has a thickness which is 5 to 50% of a thickness of the laminated polyester base film.

5. The biaxially oriented laminated polyester base film of claim 1, wherein the stress when the biaxially oriented laminated polyester base film is extended in the longitudinal direction by 5% is in the range of from 12 to 15 kg/mm² the residual extension in the longitudinal direction is 0.15% or less, and the film thickness is in the range of from 9 to 12 μm.

6. The biaxially oriented laminated polyester base film of claim 1, wherein the stress when the biaxially oriented laminated polyester base film is extended in the longitudinal direction by 5% is in the range of from 15 to 20 kg/mm², the residual extension in the longitudinal direction is 0.15% or less, and the film thickness is in the range of from 6 to 9 μm.

7. The biaxially oriented laminated polyester base film of claim 1, wherein the stress when the biaxially oriented laminated polyester base film is extended in the longitudinal direction by 5% is at least 20 kg/mm², the residual extension in the longitudinal direction is 0.15% or less, and the film thickness is in the range of from 4 to 6 μm.

8. The biaxially oriented laminated polyester base film of claim 1, wherein the polyester of each of the first polyester layer and the second polyester layer is polyethylene terephthalate.

9. A biaxially oriented laminated polyethylene-2,6-naphthalenedicarboxylate base film for a magnetic tape for use in a cassette for a digital audio tape recorder, characterized in that:
   (a') the stress when the biaxially oriented laminated base film is extended in the longitudinal direction by 5% is at least 23 kg/mm²,
   (b) the residual extension in the longitudinal direction is 0.2% or less and the residual extension in the transverse direction is 0.3 or less,
   (c') the heat shrinkage in tile longitudinal direction after a heat treatment under no load at 105° C. for 30 minutes is 0.5% or less,
   (d') a first polyester layer having an Ra of 8 nm or less and a second polyester layer having an Ra in the range of from 8 to 40 nm are outermost layers, both the polyesters for the first and second polyester layers being polyethylene-2,6-naphthalenedicarboxylate, and
   (e') the laminated film thickness is in the range of from 3 to 6 μm.

10. The biaxially oriented laminated polyethylene-2,6-naphthalenedicarboxylate base film of claim 21, wherein the first polyester layer provides a surface on which a magnetic layer is to be formed.

11. The biaxially oriented laminated polyethylene-2,6-naphthalenedicarboxylate base film of claim 21, wherein the second polyester layer has an Ra in the range of from 10 to 40 nm.

12. The biaxially oriented laminated polyethylene-2,6-naphthalenedicarboxylate base film of claim 21, wherein the second polyester layer has a thickness which is 5 to 50% of a thickness of tile laminated polyester base film.

13. The biaxially oriented laminated polyethylene-2,6-naphthalenedicarboxylate base film of claim 21, wherein the residual extension in the longitudinal direction is 0.15% or less.

14. The biaxially oriented laminated polyethylene-2,6-naphthalenedicarboxylate base film of claim 21, wherein the stress when the laminated film is extended in the transverse direction by 5% is at least 12 kg/mm².

* * * * *